G. WESTINGHOUSE, Jr.
Hose-Couplings.
No. 136,397. Patented March 4, 1873.
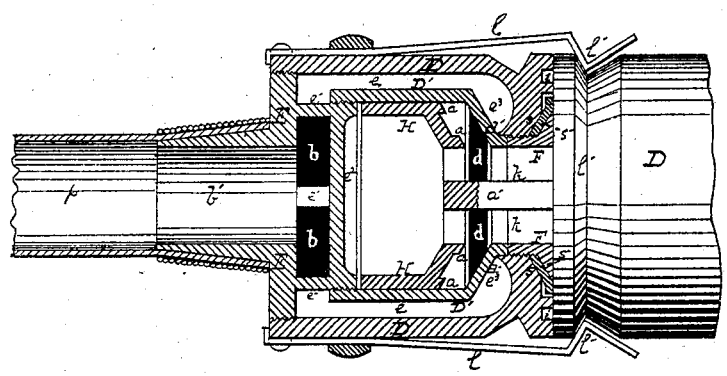
Witnesses:
R. E. Henderson
James I. Kay
Inventor:
George Westinghouse Jr.
by Bakewell, Christy & Kerr,
his att'ys

UNITED STATES PATENT OFFICE.

GEORGE WESTINGHOUSE, JR., OF PITTSBURG, PENNSYLVANIA.

IMPROVEMENT IN HOSE-COUPLINGS.

Specification forming part of Letters Patent No. 136,397, dated March 4, 1873.

*To all whom it may concern:*

Be it known that I, GEORGE WESTINGHOUSE, Jr., of Pittsburg, in the county of Allegheny and State of Pennsylvania, have invented a new and useful Improvement in Hose-Couplings; and I do hereby declare that the following is a full, clear, and exact description thereof, reference being had to the accompanying drawing making a part of this specification, which represents a sectional view of one of my improved couplings and an outside view of the inner end of the other.

In the air-brakes now in common use, compressed air is employed, which operates by pressure. In each of the couplings by which the brake-pipes are connected together a valve is arranged of such construction that when the couplings are united the valves will be unseated, so as to have an open passage-way for the flow of the compressed air; and when the couplings are disconnected the pressure of the air in the pipes back of the valves will seat them, and thereby prevent the escape of the air.

My present improvement relates to the couplings and valves for vacuum brake-pipes—that is, brake-pipes from which the air is exhausted instead of being compressed therein, so that the brakes shall be applied by atmospheric pressure. By this improvement is secured in connection with this class of brakes the same useful result, viz., the unseating of the valves when the pipes are coupled, and the automatic seating of the valves, and the consequent preservation in the pipes of the vacuum or partial vacuum there attained in case the couplings from any cause become disconnected.

To enable others skilled in the art to make and use my improvement, I will describe its construction and mode of operation.

The main part of the coupling consists of four parts, viz., an outer shell, D, a valve-box, D', a pipe-connection, E, and the ring F, each of the form substantially as shown. Between the outer shell D and the valve-box D' is an annular space, $e$. The rear ends of both the shell D and valve-box D' are closed by the pipe-connection E, except that a series of ports, $b$, leads from the thimble $b'$ to the annular space $e$, the bridges $e^1$ serving to connect the plate $e^2$ with the rest of E. The air-exhaust pipe $p$ is connected with the thimble $b'$ in the usual way. The annular space $e$ extends forward over a portion of the forward end of the valve-box D' as at $e^3$, and a series of ports, $d$, leads through between the bridges $d'$ to the inside of the valve-box D'. From here the air passes along the opening $k$ to the next coupling, which is of like construction, or in the reverse direction, according as the air is being exhausted at one end or the other. Inside the valve-box D' is a sliding piston-valve, H, having a double annular seat, $a$, at its forward end, such as when the valve is seated will cover and close the ports $d$. A series of radial bridges connects the forward end of the valve with the stem $a'$, which stem projects so far forward that when the coupling is united together it will then engage a like stem in the other coupling, unseat its valve, and by it be thrust back so as to unseat the valve H. It will now be seen that with the devices in the position shown the ports $d$ will be open for the passage of the air from the line of pipe and from the brake-cylinders; and in case the couplings become disconnected while a vacuum or a partial vacuum exists in the pipes and cylinders, the valves will drop to their seats by their own weight, (the couplings of course hanging down,) and then the effect of the vacuum will be to hold them to their seats; or, to state it more correctly, the pressure of the external air, operating on the inside of the valves H, will hold them to their seats and keep the ports $d$ closed. To secure a tight joint between the two half couplings, I make an annular countersunk gasket-seat, $s$, in the end of each shell D. In this seat I arrange an elastic packing-ring, $s'$, and hold it in place by the flanged screw-ring F. I prefer to make the outer part of the seat $s$ a little larger than the corresponding part of the gasket $s'$, and then by the exhaustion of the air inside the coupling, and the pressure of the air back of the rings $s'$, the contiguous faces of the rings $s'$ will be brought into closer contact so as to make an air-tight joint. Dowel-pins may be inserted in the recesses $i$, if so desired, for keeping the couplings in the same axial line. The coupling shown is a butt-coupling, and for holding the couplings together the usual hooked springs $l$ and catches $l'$ may be employed, or other detachable fastening of like function.

By the term vacuum, as above used, I mean what is commonly known by that name as a partial vacuum.

The devices described may be varied somewhat in arrangement, and all variations which secure the same function, with substantially the same means, I include in my invention.

What I claim as my invention, and desire to secure by Letters Patent, is—

1. A butt-coupling for vacuum-pipes, having a valve, H, which shall, when the couplings are disconnected, fall to its seat and cover a port, ports, or openings leading from the through passage-way at or near one end of the valve-case, and re-entering the through passage-way at or back of the other end, substantially as set forth.

2. A packing-ring, $s$, arranged in the face of a butt-coupling, with an air-space in the rear thereof, for the application of external pressure in seating the same, substantially as set forth.

In testimony whereof I, the said GEORGE WESTINGHOUSE, Jr., have hereunto set my hand.

GEORGE WESTINGHOUSE, JR.

Witnesses:
 W. N. PAXTON,
 G. H. CHRISTY.